June 20, 1961 M. BERG, JR 2,988,961
ROCKET LAUNCHER
Filed Dec. 7, 1956 4 Sheets-Sheet 1
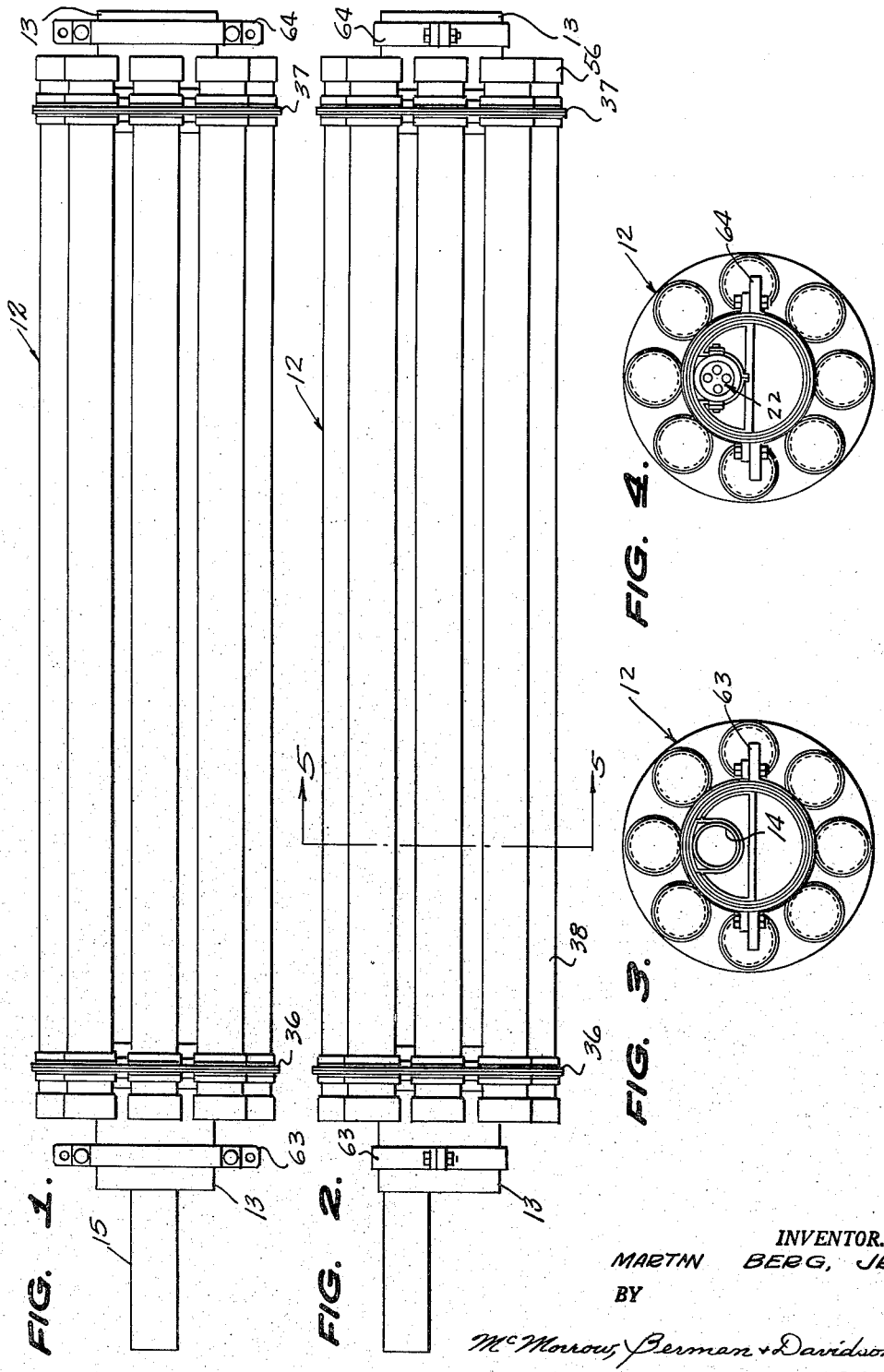
INVENTOR.
MARTIN BERG, JR,
BY
McMorrow, Berman + Davidson
ATTORNEYS.

June 20, 1961

M. BERG, JR 2,988,961

ROCKET LAUNCHER

Filed Dec. 7, 1956

4 Sheets-Sheet 2

INVENTOR.
MARTIN BERG, JR.
BY
McMorrow, Berman & Davidson
ATTORNEYS.

June 20, 1961
M. BERG, JR
2,988,961
ROCKET LAUNCHER
Filed Dec. 7, 1956
4 Sheets—Sheet 3
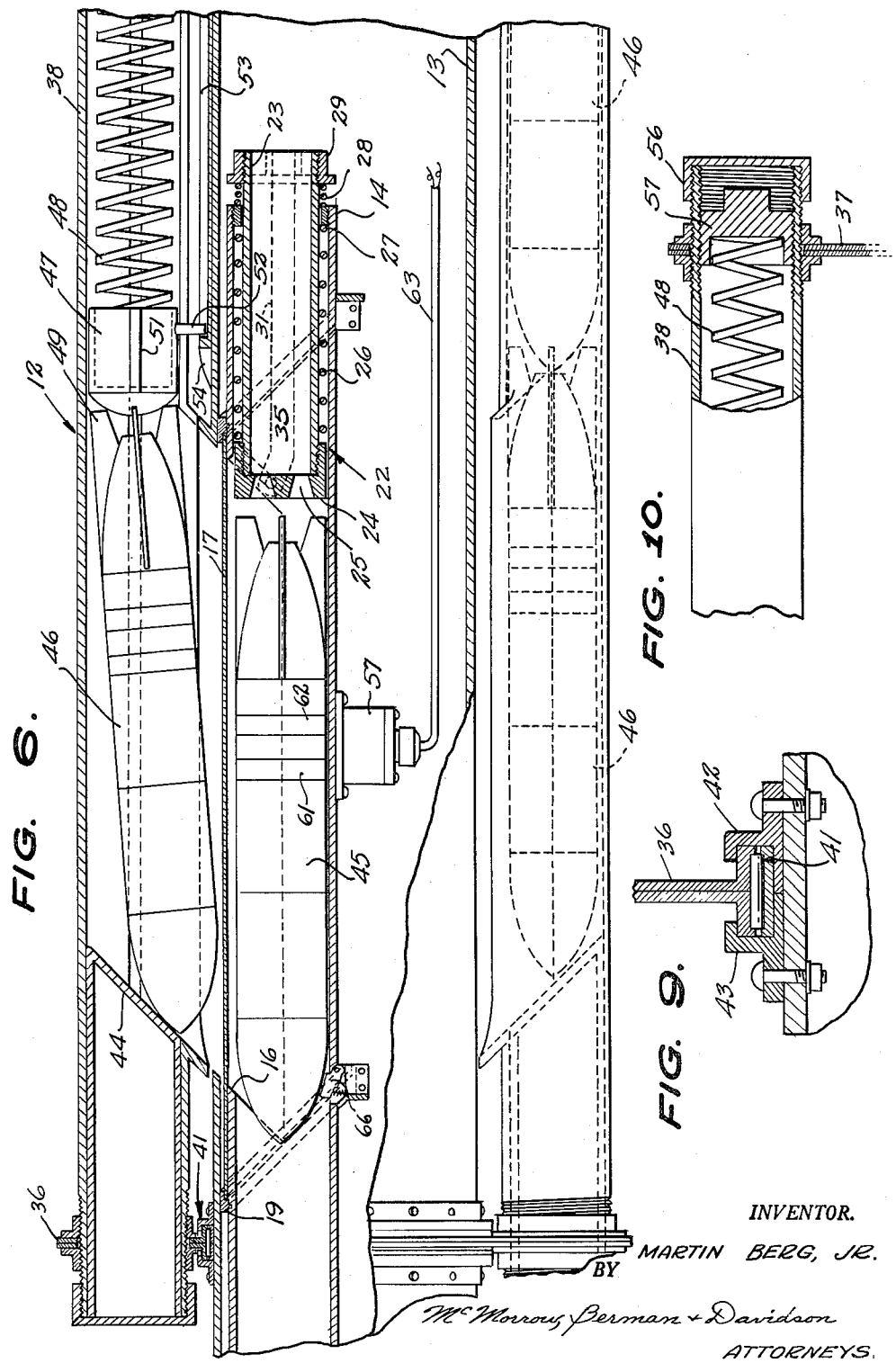
INVENTOR.
MARTIN BERG, JR.
BY
McMorrow, Berman & Davidson
ATTORNEYS.

June 20, 1961  M. BERG, JR  2,988,961
ROCKET LAUNCHER
Filed Dec. 7, 1956  4 Sheets-Sheet 4

INVENTOR.
MARTIN BERG, JR,
BY
McMorrow, Berman & Davidson
ATTORNEYS.

United States Patent Office 2,988,961
Patented June 20, 1961

2,988,961
ROCKET LAUNCHER
Martin Berg, Jr., 930 Logan St., Denver, Colo.
Filed Dec. 7, 1956, Ser. No. 626,960
1 Claim. (Cl. 89—1.7)

The present invention relates to a rocket launcher for installation in an aircraft.

An object of the present invention is to provide a rocket launcher for an aircraft which lends itself to rapid firing of rockets in succession.

Another object of the present invention is to provide a rocket launcher for an aircraft which is compact in size and carries a relatively large supply of rockets, one which is simple in structure, sturdy in construction and having few moving parts, one which is economical to manufacture and assemble, and one which is highly effective in action.

Figure 5:
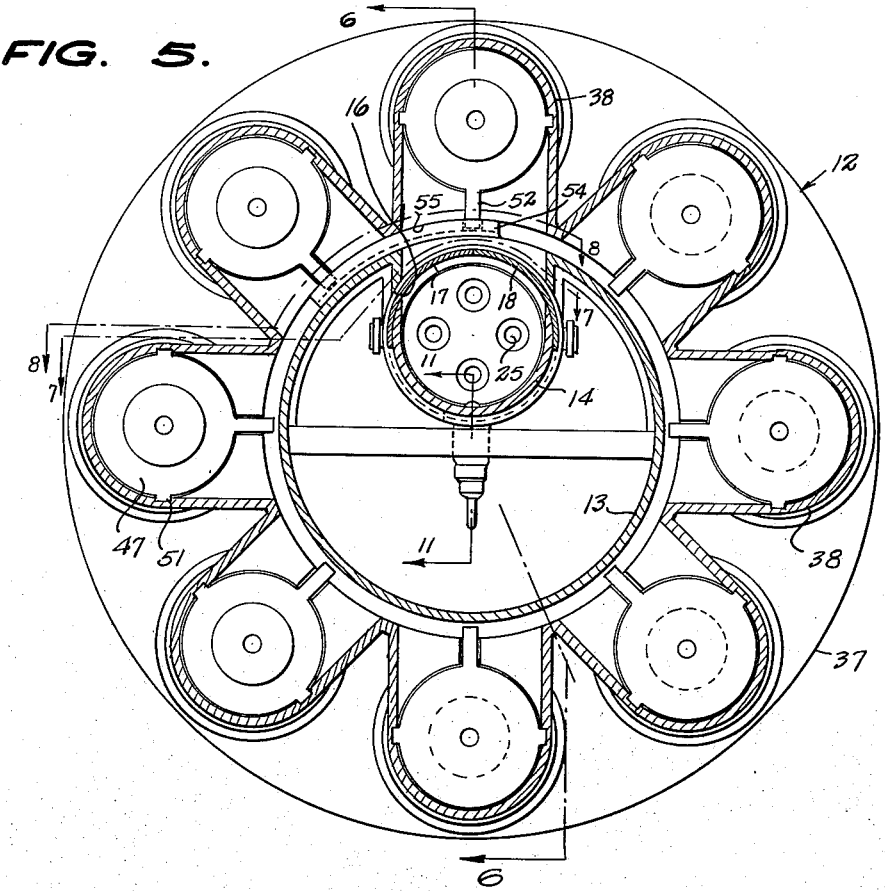

These and other objects and advantages of the present invention will be fully apparent from the following description when taken in connection with the annexed drawings, in which:

FIGURE 1 is a plan view of the rocket launcher according to the present invention, FIGURE 2 is an elevational view, FIGURE 3 is an elevational view of the rocket launcher taken from the front end of the same, FIGURE 4 is an elevational view taken from the rear, FIGURE 5 is a sectional view, on an enlarged scale, taken on the line 5—5 of FIGURE 2, FIGURE 6 is a sectional view taken on the line 6—6 of FIGURE 5, with a portion of the tube rearward end broken away.

Figure 11:
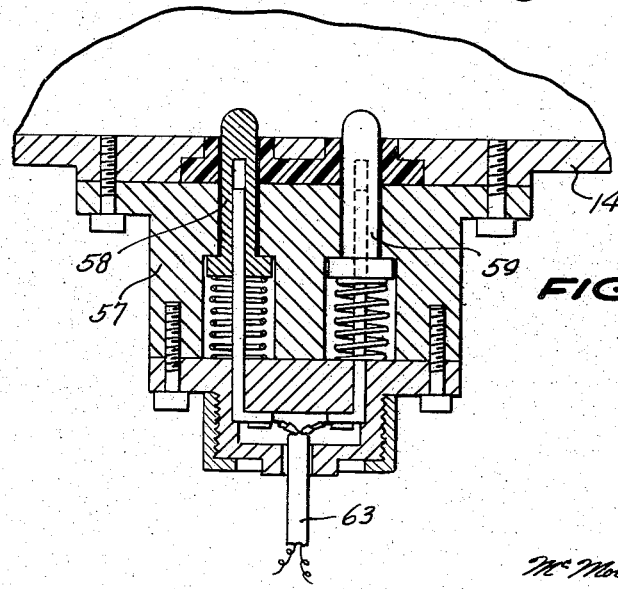
Figure 7:
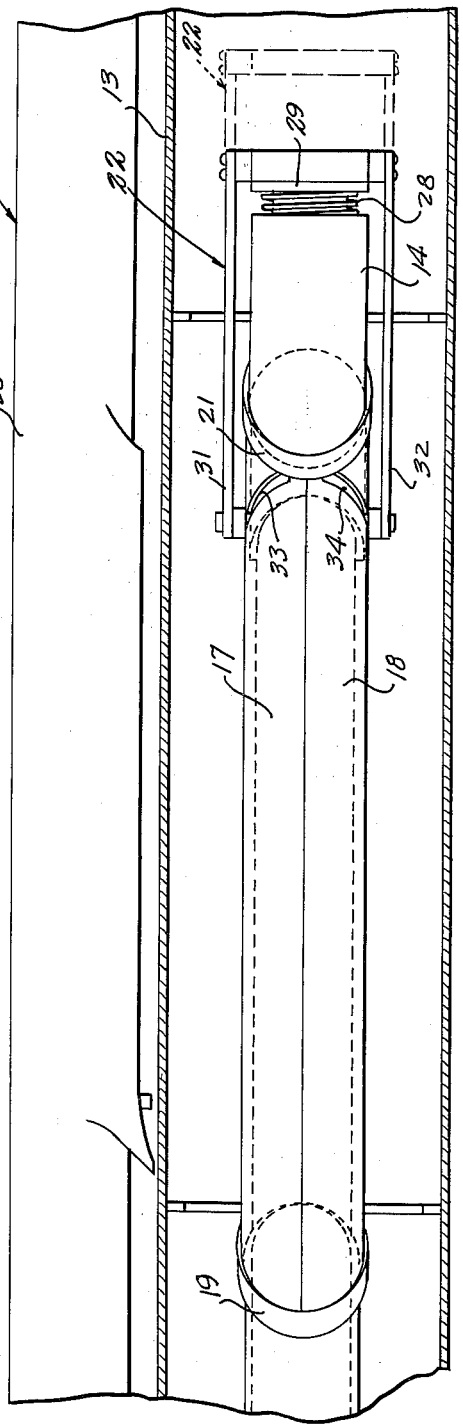
Figure 8:
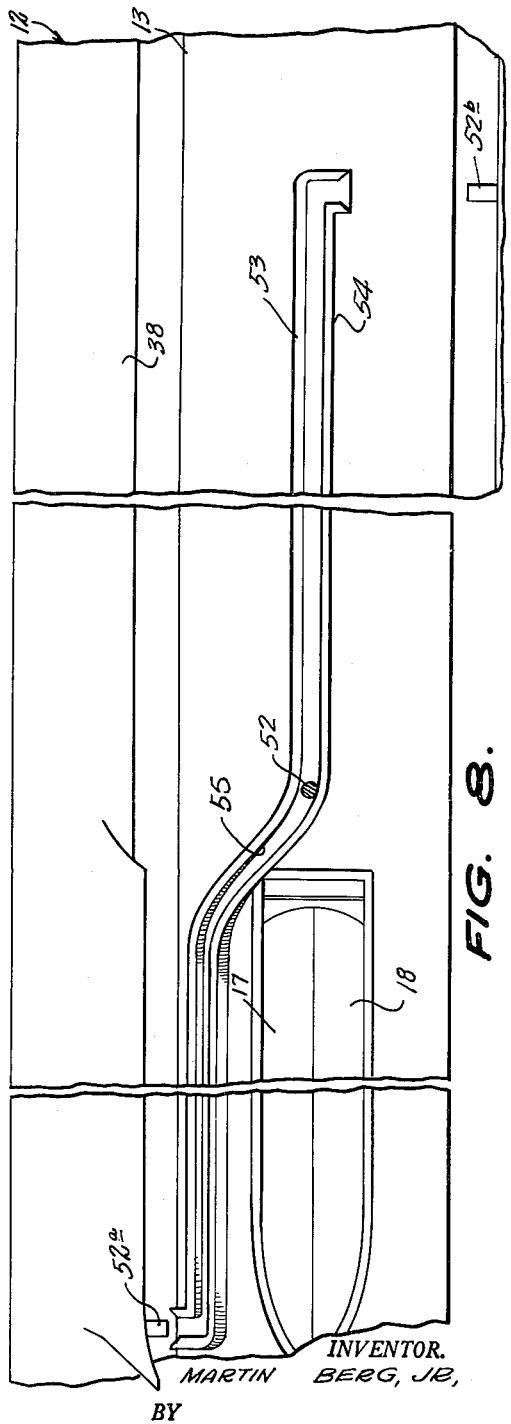

FIGURE 7 is a sectional view, on an enlarged scale taken on the line 7—7 of FIGURE 5, FIGURE 8 is a fragmentary sectional view, on an enlarged scale, taken on the line 8—8 of FIGURE 5, FIGURE 9 is a detail sectional view of the magazine support means shown in FIGURE 6, FIGURE 10 is a fragmentary sectional view of the portion of the tube omitted in FIGURE 6, and FIGURE 11 is a sectional view, on an enlarged scale, taken on the line 11—11 of FIGURE 5.

Referring in greater detail to the drawings in which like numerals indicate like parts throughout the several views, the rocket launcher according to the present invention is indicated generally by the reference numeral 12 and comprises a cylindrical support member 13 having therein and adjacent one side a horizontally disposed cylindrical tube 14 having an end portion 15 projecting from one end of the support member 13. The tube 14 is provided with a longitudinally extending closed opening 16 intermediate the ends thereof as shown most clearly in FIGURE 6.

A pair of doors 17 and 18, each in the form of a sector, are positioned normally in closing edge-to-edge abutting relation closing the opening 16, as shown in FIGURES 7 and 8, the edge of the door 17 being shown in section in FIGURE 6.

The doors 17 and 18 are mounted in annular sloping tracks 19 and 21 at the forward ends and rearward ends respectively, for movement rearwardly and outwardly from the position in which the edges of the doors 17 and 18 are in abutting relation to a position in which they are out of abutting relation and in which the doors 17 and 18 wholly uncover the opening 16.

Means is provided for effecting the movement of the doors 17 and 18 from the edge abutting position to edge out of abutting position and specifically, this means comprises an actuation member 22 positioned within the tube 14 rearwardly of the opening 16 and mounted therein for movement toward and away from the opening 16.

The actuation member, shown in sectional view in FIGURE 6, consists in a horizontally disposed sleeve 23 having on its end adjacent the opening 16 a cup member 24 having discharge orifices 25 in its bottom. A helical spring having spaced convolutions extends between the adjacent end of the cup member 24 and a ring 27 threadedly mounted within the open end of the tube 14 and biases the actuation member 22 toward the opening 16. Another spring 28 is on the other side of the ring 27 opposite to the spring 26 and abuts against the ring 27 and against the adjacent portion of a flanged collar 29 and serves as a buffer for the actuation member 22 at the end of its movement toward the opening 16. The flange of the flanged collar 29 also acts as a stop and prevents the actuation member 22 from moving wholly within the tube 14.

Referring to FIGURES 5 and 7, means is provided for effecting the movement of the doors 17 and 18 in response to rearward movement of the member 22 and comprises a pair of arms 31 and 32 operatively connecting the member 22 to the doors 17 and 18, respectively, the arms 31 and 32 being pivotally connected to the rearward ends of the doors 17 and 18 and each provided with a pin which extends into grooves 33 and 34 in the doors 17 and 18 respectively, the grooves 33 and 34 being disposed so as to slope rearwardly and toward the abutting edges of the doors 17 and 18 respectively. The pin which projects from the arm 31 is shown in dotted lines in FIGURE 6 and indicated by the reference numeral 35 travels in the groove 33 upon actuation of the member 22 in response to gas blasts generated by a fired rocket within the tube 14 and causes the door 17 to move from its edge-abutting position to its position fully uncovering the opening 16. Another pin 35 associated with the arm 32 effects the same movement of the door 18.

Referring to FIGURES 1, 2 and 5, it will be seen that a disc 36 is disposed transversely of the support member 13 adjacent the forward end of the latter and another disc 37 is disposed transversely of the member 13 inwardly of the rearward end of the member 13. The discs 36 and 37 form the means for supporting in spaced relation about the member 13 a plurality of tubes 38 each of identical construction and constituting a magazine positioned in spaced relation with respect to the tube 14. In FIGURE 6 it will be seen that the tubes 38 each have a longitudinally extending discharge opening 39 which becomes in registry with the opening 16 upon rotary movement of the tubes 38 about the member 13 as a unit. In FIGURES 6 and 9 it will be seen that the disc 36 is attached to the support member 13 by means of roller bearing assemblies 41 spaced therearound and working between flanges 42 and 43 bolted to the outer wall of the member 13. The disc 37 is similarly mounted for rotation about the support member 13 so that the tubes 38 are carried therearound in spaced relation to bring the discharge opening 39 of each into registry with the opening 16 and with the doors 17 and 18 when they are in their position covering the opening 16.

In FIGURE 6 it will be seen that an abutment 44 is positioned forwardly of and adjacent the discharge opening 39 in the magazine tube 38 and slopes upwardly and inwardly toward the discharge opening 39. A rocket 45 is positioned within the tube 14 in firing position and another rocket 46 is within the magazine tube 38 and in alignment with and adjacent the opening 39 in the magazine tube 38 with a portion adjacent the forward end of the rocket resting upon the closed doors 17 and 18 with the forward end bearing against the abutment 44. A follower 47, biased forwardly by means of a spring 48, is positioned within the tube 38 and has its forward end detachably engaging the fins 49 on the rearward end of the rocket 46. Shoulders 51 on each side of each of the followers 47 are received in appropriately shaped grooves formed in the inner walls of the tubes 38 for positioning the followers 42 within the tube 38.

A pin 52 projects from the side of each of the followers 47 adjacent to the support member 13 and is receivable within the space between a pair of upstanding walls, FIGURE 8, formed on the one side of the support member 13 adjacent to and spaced from the tube 14. The walls are indicated by the reference numerals 53 and 54 and together constitute a groove receiving the pins 52 successively and causing the rotation of the tubes 38 around the member 13. In FIGURE 8 it will be seen that the pin 52 is about to enter the cam section 55 of the groove formed by the walls 53 and 54 and a pin 52a has left the forward end of the groove thus formed while another pin 52b is about to enter the rearward end of the groove.

It is an important feature of the present invention that each of the tubes 38 be of such length that a plurality, as many as six or more, of rockets 46 may be contained therein and the grooves formed by the walls 53 and 54 be of a comparable length in the section between the rearward end of the groove and the cam section 55 so that the associated follower 47, after it has pushed each of the rockets 46 forwardly and into the tube 48 for successive firing, the follower then travels for the length of another rocket to the end of the tube 38 adjacent the abutment 44. It is this movement that carries the pin 52 through the cam section 55 of the groove and to the forward end of the groove and out therefrom to the position indicated by the pin 52a.

The end of each of the tubes 38 is closed by means of a cap 56 having seated therein a spring abutment member 57 against which is engaged the end of the spring 48.

Referring to FIGURE 11, the means by which the rockets 45 and 46 are successively ignited is shown and consists in a nonconductive block 57 secured to the side of the tube 14 opposite to the side having the opening 16 and providing a means for positioning a pair of resiliently mounted contact pins 58 and 59 which engage and conduct electricity to the conductive rings 61 and 62 provided upon the body of each of the rockets 45 and 46. Conventional means within the aircraft is used to supply current through the conduit 63 to the contact pins 58 and 59 for the firing of each of the rockets, there being suitable electrically actuated fuse means within each of the rockets 45 and 46 and not here illustrated as being a part of the invention.

Split rings 63 and 64 secured about the forward and rear ends of the members 13, respectively, form a means by which the launcher 12 of the present invention may be mounted within the aircraft.

In use the caps 56 on the ends of the tubes 38 are removed, together with the blocks 57 and each of the tubes 38 is filled with the desired number of rockets 46. If the tube 14 is empty of rockets, the actuating member 22 must be manually pulled rearwardly to effect the rearward and opening movement of the doors 17 and 18 so that one of the rockets 46 within one of the tubes 38 may leave the discharge opening 39 of the tube 38 and enter the opening 16 in the tube 14 and to be held there in firing position by means of spring biased abutment members 66 which are mounted in the wall of the tube 14 on the side opposite to the side having the doors 17 and 18 and rearwardly of the forward end of the opening 16 so as to releasably engage a portion of the rocket 45 to be fired inwardly of the nose of the latter. Upon ignition of the rocket by the conventional fuse means, the gas blast will partially escape through the discharge orifice 25 provided in the bottom of the cup member 24 and as the rocket 45 moves forwardly within the tube 14 the gas blast will drive the actuating member 22 rearwardly and result in the opening of the doors 17 and 18 and permitting the next rocket 46 in alignment with doors 17 and 18 to enter through the opening 16 and to take up a position ready for firing. After each rocket is fired and the doors 17 and 18 have been opened and a new socket is in position in the tube 14, the actuating member 22 will move under pressure of the spring 26 from the dotted line position shown in FIGURE 7 to the former position rearwardly of the opening 16, thereby effecting the closing of the doors 17 and 18.

It will be seen therefore that the rocket launcher according to the present invention will lend itself to rapid successive firing of rockets in a highly efficient manner when mounted in an aircraft or in any installation and may be maneuvered to direct the tube 14 toward the target.

What is claimed is:

A rocket launcher comprising a horizontally disposed cylindrical tube having a longitudinally extending closed opening intermediate the ends thereof for the ingress of a rocket therethrough, a pair of doors each in the form of a sector normally in closing edge-to-edge abutting relation and closing said opening and mounted on said tube for movement to a position in which the abutting edges of said doors are out of abutting relation and wholly uncover said opening, a magazine positioned in spaced relation with respect to said tube and having a longitudinally extending discharge opening in registry with the closed doors of said tube, an abutment in said magazine forwardly of and adjacent said discharge opening and sloping downwardly and inwardly toward said discharge opening, a rocket in said magazine and in alignment with and adjacent said discharge opening in said magazine and having a portion adjacent one end resting upon said closed doors with said one end bearing against said abutment, a spring-biased follower in said magazine detachably engaging the other end of said rocket, a member positioned in said tube rearwardly of said opening and mounted for longitudinal movement toward and away from said opening, and means operatively connecting said member to said doors, said member being actuable in response to gas blast generated by a fired rocket in said tube to effect the movement of said doors from the position closing said opening to the position wholly uncovering said opening and to thereby permit the rocket in said magazine to be discharged from the discharge opening of said magazine through said opening and into firing position in said tube.

References Cited in the file of this patent

UNITED STATES PATENTS

| | | |
|---|---|---|
| 2,096,028 | Burton et al. | Oct. 19, 1937 |
| 2,440,634 | Henney | Apr. 27, 1948 |
| 2,451,522 | Uhl et al. | Oct. 19, 1948 |
| 2,587,672 | Whitson | Mar. 4, 1952 |
| 2,717,534 | Atherton | Sept. 13, 1955 |
| 2,774,282 | Ballash et al. | Dec. 18, 1956 |
| 2,800,835 | Mayer | July 30, 1957 |

FOREIGN PATENTS

| | | |
|---|---|---|
| 123,246 | Sweden | Nov. 9, 1948 |
| 636,422 | Great Britain | Apr. 26, 1950 |